United States Patent [19]

Hart et al.

[11] 3,755,190

[45] Aug. 28, 1973

[54] CAPSULE MANUFACTURE

[75] Inventors: Ronald L. Hart, Dayton; Donald D. Emrick, Kettering; Robert G. Bayless, Yellow Springs, all of Ohio

[73] Assignee: The National Cash Register Company, Dayton, Ohio

[22] Filed: Nov. 9, 1971

[21] Appl. No.: 197,160

[52] U.S. Cl.......... 252/316, 117/100 A, 117/100 B, 264/4, 424/32, 424/33
[51] Int. Cl............................ B01j 13/02, B44d 1/02
[58] Field of Search.................. 252/316; 117/100 A; 424/32, 33; 264/4

[56] References Cited
UNITED STATES PATENTS

| | | | |
|---|---|---|---|
| 3,576,660 | 4/1971 | Bayless et al. | 252/316 X |
| 2,410,417 | 11/1946 | Andersen | 424/32 X |
| 3,432,327 | 3/1969 | Kan et al. | 252/316 X |
| 3,531,418 | 9/1970 | Fanger et al. | 252/316 |

*Primary Examiner*—Richard D. Lovering
*Attorney*—E. Frank McKinney and Robert J. Shafer

[57] ABSTRACT

A process is disclosed for performing encapsulation, en masse, by an in situ polymerization reaction of polyhydroxy phenolic materials with aldehyde materials. The polyhydroxy phenolic material is provided, for reaction in the system, as a water-soluble complex combined with a highly hydrolyzed form of poly(vinyl alcohol). Liquid-liquid phase separation is accomplished and maintained by increase in the molecular weight of the phenolic/aldehyde reaction product without use of any phase-separation-inducing materials. The poly(vinyl alcohol) serves a dual purpose of controlling the polyhydroxy phenolic/aldehyde polymerization reaction and acting as a sort of toughening additive for the completed capsule wall material.

12 Claims, No Drawings

CAPSULE MANUFACTURE

BACKGROUND OF THE INVENTION

Field of the Invention

This invention pertains to a process for manufacturing minute capsules, en masse, in a liquid manufacturing vehicle. The process involves liquid-liquid phase separation of a relatively concentrated solution of polymeric material to be used in formation of walls for the minute capsules.

Many combinations of materials have been used in the past in search of compositions which yield certain desired or required physical characteristics in capsule walls. For many of the products in which capsules find use, the capsule walls must be substantially impermeable to diffusion of volatile solvents and must also be relatively flexible and capable of withstanding normal handling forces without rupture. These requirements are more critical for capsules of very small size. As capsule size is decreased, the individual capsule wall thickness is proportionately decreased and, also, the capsule wall surface area per unit weight of material contained is greatly increased. The decreased capsule wall thickness makes flexible capsule walls a desirable characteristic and the increased surface area increases the tendency for loss of volatile, capsule-contained, solvents by diffusion and makes capsule wall impermeability a desirable characteristic.

It is, therefore, an object of the present invention to provide a process for manufacturing minute capsules having improved impermeability against diffusion of the contents through the capsule walls and having improved flexibility to protect against rupture of the capsules during normal handling prior to capsule use.

It is, further, an object of the present invention to provide such an encapsulating process especially for manufacturing very small capsules.

An object of the present invention is to provide a process for manufacturing capsules with the above improvements wherein the capsule wall material includes the polymer product of a polyhydroxy phenolic material and an aldehyde and an amount of poly(vinyl alcohol). An additional object of the present invention is to provide a capsule manufacturing process by liquid-liquid phase separation using the above-named materials and in the absence of a material for causing and maintaining liquid-liquid phase separation.

Description of the Prior Art

South African Patent Number 62/939 issued Mar. 6, 1962, on the application of Matson, discloses encapsulation by liquid-liquid phase separation accomplished through in situ polymerization of certain amides or amines and aldehydes. That phase separation is also disclosed utilizing phenol and an aldehyde in a polymerization reaction. The encapsulating process of that South African patent requires additional dilution steps as the polymerization reaction proceeds. There was no disclosure of a reaction of aldehydes with polyhydroxy phenolic material as a major reaction component and there was no disclosure of complexing of any of the capsule wall components with any other material. Similar disclosure was made in U.S. Pat. No. 3,516,941 issued June 23, 1970 but that patent contained a caution against using a large amount of phenolic materials or emulsifiers in the encapsulating system.

British Pat. No. 1,190,721 granted Sept. 2, 1970 on the application of the assignee herein, disclosed composite capsule walls including hydrophilic polymeric material interspersed by a hydrophobic polymeric material. The hydrophilic material was disclosed to be, for example, gelatin or poly(vinyl alcohol) and the hydrophobic polymeric material was disclosed to be, for example, in situ-generated condensate of a polyhydroxy phenolic material and an aldehyde. In that British patent, however, the initial capsule wall of hydrophilic polymeric material was deposited by a liquid-liquid phase separation utilizing a phase-separation-inducing-material and only after the initial deposition as a preformed capsule wall, the polyhydroxy phenolic material was reacted with an aldehyde to yield the hydrophobic, interspersed, capsule wall component. In that British patent there was no condensation of polymerizing capsule wall materials prior to deposition of the capsule walls.

British Pat. No. 1,198,412 granted Nov. 11, 1970 on the application of the assignee herein, disclosed capsule walls of a complex of poly(vinyl alcohol) and a polyhydroxy phenolic material wherein material of the complex was subsequently polymerized in a reaction with an aldehyde. In that British patent, the capsule wall materials were deposited prior to any polymerization and the deposition was accomplished by use of a phase-separation-inducing-material.

SUMMARY OF THE INVENTION

Phenol/formaldehyde and urea/formaldehyde polymeric materials generated in an aqueous capsule manufacturing vehicle result in rather brittle films of capsule wall material. The reaction is controllable with regard to rate of polymer formation and deposition of a capsule wall, but, for reasons not entirely understood, the film is brittle and easily cracked and capsule walls made of the film rupture readily even under normal handling forces. An equivalent polymerization, but utilizing resorcinol or other polyhydroxy phenolic material, has generally been found to have a reaction rate which is too fast for good capsule wall formation. The polymerization of the polyhydroxy phenolic material is relatively uncontrollable and occurs at such a rapid rate that the separated phase of polymeric material is quickly converted from liquid to solid and has no adequate opportunity to form capsule walls.

The process of the present invention provides for a capsule-wall-forming condensation reaction utilizing complexed polyhydroxy phenolic materials wherein the reaction is controlled to such a degree that the separation phase of polymeric material remains liquid long enough to enwrap intended capsule core entities to eventually yield smooth and well-constructed capsule walls.

Additionally the process of the present invention results in manufacture of capsule walls which are relatively impermeable and flexible. The capsule walls of this invention are tough and relatively flexible to the extent that the capsules can easily survive normal handling forces without rupture.

A system component material specially utilized in the present process, which material is believed to be required both for controlling the polycondensation reaction and for imparting a degree of flexibility and toughness to the capsule wall, is poly(vinyl alcohol) of a high degree of hydrolysis.

Processes have been disclosed in the prior art wherein polyhydroxy phenolic material, such as resorcinol, has been utilized in a reaction with poly(vinyl alcohol) to yield capsule walls; but such prior art processes have always been disclosed to require the use of some phase-separation-inducing material. These processes of the prior art have not disclosed that a polycondensation capsule manufacturing system involving poly(vinyl alcohol) can be made without a phase-separation-inducing material. Moreover, in the processes of the prior art, phase-separation-inducing materials are taught to be important in maintaining poly(vinyl alcohol) as a major constituent of the capsule wall composition.

The present invention utilizes, as a starting material in the polycondensation reaction, a complex of poly(vinyl alcohol) and a polyhydroxy phenol which complex is soluble in an aqueous capsule manufacturing vehicle.

The starting material, in aqueous solution, is subjected to reaction with an aldehyde wherein the polyhydroxy phenol is condensed with the aldehyde to yield a separation liquid phase which is concentrated in the phenol-aldehyde condensation polymer and relatively dilute in poly(vinyl alcohol).

It is speculated that one reason for the improved quality of the capsule walls of the present invention is in an interference of poly(vinyl alcohol) with the polycondensation reaction between the polyhydroxy phenolic material and the aldehyde material. Although not important to operation of the invention and therefore not necessary to support of the claims herein, the inventors believe that a condensation reaction between phenolic materials and aldehydic materials results in a relatively brittle polymer product because the phenolic materials have a tendency to react in molecular blocks rather than to react as individual molecules with the aldehyde. When the phenolic material is supplied as a complex with poly(vinyl alcohol), the inventors believe that the phenolic material is condensed with the aldehyde on a molecule-by-molecule basis rather than by condensation with a large block or molecular cluster of monomeric phenolic materials. Such molecule-by-molecule reaction is believed to result in a tougher and more flexible polymeric material.

Also, in the course of the polymerization, some poly(vinyl alcohol) is either entrapped in, or is residually complexed with, the phenolic material of the condensation reaction and it is believed that the poly(vinyl alcohol) operates as a kind of filler or reinforcing agent to modify and strengthen the polymerized material.

The capsules which result from practice of the present invention have improved qualities with regard to impermeability of capsule wall material and consequent release of capsule contents by permeation through the capsule walls. Although the reasons for such improved qualities are not entirely understood and although an understanding is not important in the practice of this invention; the inventors believe that the improvements occur, among other reasons, because spontaneous phase separation using phase separation inducing agents and with a subsequent polymerization of the capsule wall components results in an excess of poly(vinyl alcohol) in the capsule walls.

An important feature of the present invention is that the poly(vinyl alcohol) serves a complicated and not well understood purpose in complexing with the phenolic material prior to a condensation polymerization with an aldehyde and in then being substantially absent from the so-condensed polymer product except for a residual reinforcing amount retained therein. Only about 2–10 percent, by weight, of the final capsule wall material is poly(vinyl alcohol).

For purposes of the polymerization and capsule wall manufacture of the present invention, it is important that the poly(vinyl alcohol) be substantially completely hydrolyzed or modified in such a way that a complex of the poly(vinyl alcohol) and a polyhydroxy phenolic material will remain soluble in the processing vehicle prior to the time that the phenolic material is reacted with an aldehyde. It is believed that the poly(vinyl alcohol) and the phenolic material must be bound but weakly so that the complex is broken on the occasion of the polycondensation with an aldehyde.

The term "poly(vinyl alcohol)" as used herein is to be understood as referring to polymeric material in which at least 50 percent, by weight, thereof is composed of vinyl alcohol constituent. The term refers to polymeric materials, all of which are composed of vinyl alcohol constituents and also to polymeric material containing not only vinyl alcohol constituents but also vinyl acetate (and/or propionate and/or butyrate) constituents providing that the vinyl alcohol constituents make up at least 50 percent, by weight, of the polymeric material. The poly(vinyl alcohol) most often used in practice of this invention is any commercial variety and is the hydrolysis product of poly(vinyl acetate). Poly(vinyl alcohol) represented by poly(vinyl acetate) which has been hydrolyzed to an extent of 96 to 100 percent, by weight, is preferably used, although poly(vinyl alcohol) having a slightly lower degree of hydrolysis may be eligible in some cases.

Eligible polyhydroxy phenolic materials which may be used in practicing the present invention include: dihydroxy, substituted and unsubstituted, aromatic materials, such as catechol, resorcinol and 4-hexylresorcinol; trihydroxy, substituted and unsubstituted, aromatic materials, such as pyrogallol, phloroglucinol, and gallic acid; and complex polyhydroxy phenolic materials having more than three hydroxyl groups per molecule, such as digallic acid or tannic acid. Although the above-mentioned materials can be used, many other water-soluble polyhydroxy aromatic materials are, also, eligible for use in the novel process. Examples of such materials include: hydroquinone; 2-hydroxyhydroquinone; β-resorcyclic acid (2,4-dihydroxybenzoic acid); orcinol; bisphenol A; and dihydroxy naphthalenes, such as naphtho-resorcinol.

Eligible aldehydic materials include: formaldehyde, furfural, glutaraldehyde and glyoxal.

Material contained by capsule walls of this invention, i.e., the capsular internal phase or capsule core material, is relatively unimportant to the practice of the invention and can be any material which is substantially water-insoluble and which does not interact with the intended capsule wall material, or with other encapsulating-system components, to the detriment of the process. A few of the materials which can be utilized as capsule internal phases include, among a multitude of others: water-insoluble or substantially water-insoluble liquids, such as olive oil, fish oils, vegetable oils, sperm oil, mineral oil, xylene, toluene, kerosene, chlorinated biphenyl, and methyl salicylate; similar substantially water-insoluble materials of a solid but meltable nature such as naphthalene and coco butter; water-insoluble metallic oxides and salts; fibrous materials, such as cellulose or asbestos; water-insoluble synthetic polymeric materials; minerals; pigments; glasses; elemental materials including solids, liquids and gases; flavors, fragrances; reactants; biocidal compositions; physiological compositions; fertilizer compositions; and the like.

The novel process of this invention includes the steps of: establishing a complex, in aqueous solution, of poly(vinyl alcohol) and a polyhydroxy phenolic material; adding a water-soluble aldehyde to the aqueous solution to yield a single-phase aqueous solution of the complex and the aldehyde; dispersing in the single-phase aqueous solution, intended capsule core material which is substantially insoluble in the solution and is chemically unreactive with any of the solutes; continuing the dispersing forces and reacting the polyhydroxy phenolic material with the aldehyde to yield a polymeric condensate material present, in the solution system, as a separated, liquid phase which wets and enwraps particles of the dispersed capsule core material; and maintaining the system to permit continued generation and reaction of polymeric condensate material to yield solid and substantially water-insoluble capsule walls. It is important to note that: (a) the single-phase, aqueous, solution is maintained up to the point where a polymeric material has been generated of such a molecular weight that phase separation spontaneously occurs; (b) the poly(vinyl alcohol) is present, in the solution system as a complex with polyhydroxy phenolic material; and (c) the process does not rely on any phase-separation-inducing-material to accomplish or maintain phase separation.

In the present invention, at least one polyhydroxy phenolic material is combined, in a liquid manufacturing vehicle, with highly hydrolyzed poly(vinyl alcohol) to yield a water-soluble complex. A selected, substantially water-insoluble, material which is to be encapsulated—the intended capsule internal phase—is dispersed in the complex-containing manufacturing vehicle which vehicle serves also as a dispersing medium. When the internal phase has been dispersed, an aldehyde is added to polymerize with the phenolic material and achieve phase separation of the polycondensate of capsule wall material. Alternatively, the aldehyde-phenolic polymerization can be commenced prior to dispersing the internal phase in the manufacturing vehicle, thus providing a two-liquid-phase system into which intended capsule internal phase material is dispersed. Of course, care must be exercised that the internal phase material be dispersed before the polymerization has proceeded to the point where the separated phase is solid.

The polymerization reaction is a condensation and preferably is conducted in an acidic medium. The condensation can be accomplished in an aqueous system having a pH of about 0 to about 7—the time and temperature requirements being variable to optimize the polymerization reaction. Also, it should be noted that a mol ratio of about 1 to 3 of polyhydroxy phenolic material to aldehydic material is usually used in this reaction but that ratios from 1 to 1.5 to about 1 to 6 are operable. The actual mol ratio limits are a matter of economic consideration.

After the reaction had progressed to the point where the capsule walls have been solidified and, in that respect, the capsule manufacture is completed, the capsules can be separated from the manufacturing vehicle by filtering, washed with water; and the capsule walls can be dried by placing the capsules in a forced air dryer. It should be understood, however, that the capsules need not have dried walls or even be separated from the liquid vehicle prior to their use. If it is desired or required for some intended purpose, the capsule product of this invention can be supplied as a slurry of capsules in a liquid carrier, either the manufacturing vehicle or not, such as for use in a paper-coating composition, a paint, an insecticide composition, or the like—such uses being well-known and previously taught in the prior art.

Individual capsules prepared by the present invention are substantially spherical and can be manufactured having diameters of less than 1 micron to about 100 microns—the preferred size range being from about 1 to about 50 microns, in diameter. The capsule product of this invention can be made to take the form either of individual capsules with each entity having, as an internal phase, one particle of capsule core material or of aggregates of individual capsules with each aggregate entity having several particles of capsule core material. Capsule aggregates can be made in sizes from a few microns in diameter to several hundred microns in diameter depending upon the size and state of the included core material.

DESCRIPTION OF THE PREFERRED EMBODIMENTS

Example 1. In this preferred embodiment, highly-hydrolyzed poly(vinyl alcohol), resorcinol, and formaldehyde are brought together in an aqueous capsule manufacturing vehicle to yield micro-capsules 1 to 10 microns in diameter and containing xylene. The poly(vinyl alcohol) used in about 99 to 100 percent hydrolyzed, has a molecular weight of about 86,000 and is characterized by having a viscosity of about 28 to about 32 centipoises in a 4 percent, by weight, aqueous solution at 20° C. (such as the material designated by the trademark, "Elvanol 71–30" sold by E. I. duPont deNemours and Co., Wilmington, Delaware, United States of America).

Into a Waring Blendor cup having a capacity of about one-liter, are placed 150 milliliters of xylene—the material to be encapsulated—, 200 milliliters of water, 160 milliliters of a 5 percent, by weight, aqueous solution of the poly(vinyl alcohol) and 12 grams of resorcinol. Also, about 2 to 4 grams of urea is added as an anti-aggregation agent for the capsules which will be manufactured. The Blendor is turned on and the xylene is emulsified to a droplet size-range of about 1 to 10 microns. It is noted that the continuous phase of capsule manufacturing vehicle is a solution which includes the poly(vinyl alcohol)-resorcinol complex and which evidences no separated phase. The emulsified contents of the Blendor cup is transferred to another vessel of one-liter capacity, equipped for heating and agitation. Agitation is commenced, the temperature is adjusted to about 40° to 45° C. and 10 milliliters of 10 percent, by volume, sulfuric acid is added to obtain a pH of about 1.6 to 1.8. Continuously, over a period of about 2 hours, a solution of 30 milliliters of formalin (37 to 38 percent, by weight, aqueous formaldehyde solution) in 60 milliliters of water is added to the system. After addition of about 20 milliliters of the aldehyde solution (about 15 to 30 minutes), microscopic observation of the capsule manufacturing system reveals a separated phase of liquid capsule wall material depositing on droplets of the intended capsule core material. Polymerization and consequent phase separation and deposition of the resorcinol-formaldehyde condensate material continues throughout the formaldehyde addition step. When formaldehyde addition is completed, the system temperature is raised to about 55° C. and the system is agitated for about 1½ to 3 hours more to complete the condensation and chemically harden the capsule walls. The capsule-containing system is then cooled to about room temperature and the pH is adjusted to about 4.5 using an aqueous sodium hydroxide solution.

The so-produced capsules can be isolated from the manufacturing vehicle as a free-flowing, dry powder (retaining a liquid in the dry capsules), or the slurry of capsules in vehicle can be used. For example, the slurry of capsules can be coated onto paper sheets and dried to make a coating of capsules having a dry appearance and feel. In response to capsule-rupturing forces, the coating of this Example yields xylene. Of course, the capsule slurry can be combined with additional binder material and with filler materials such as wood cellulose fibers, if either are desired or required. Also, the xylene capsule content could include a colored or colorable dye or dye coreactant or other color generating material for use in a pressure-responsive paper system.

Tests have shown that the capsule walls of this invention include about 2 to 10 percent, by weight, of poly(vinyl alcohol).

Example 2. As an alternative process of that of Example 1, above, an initial emulsion can be prepared which includes all of the materials in that emulsion of Example 1 except that the resorcinol is omitted. In this alternative process, resorcinol and the formaldehyde are added simultaneously as a freshly prepared solution. The resorcinol and formaldehyde solution can be added in two or more portions;—each portion being prepared immediately prior to addition to ensure against polymerization reaction before the resorcinol can complex with the poly(vinyl alcohol). It should be noted that if the resorcinol and formaldehyde are permitted to polymerize in the absence of the poly(vinyl alcohol), the product which is separated from solution is a solid and is entirely unfit for use as capsule wall material. In using two portions of solution, the first can be made up of 10 milliliters of formalin and 5 grams of resorcinol in 30 milliliters of water and it can be added at one time. After continuing agitation for a period of about one-half to one hour, the second portion can be added in a dropwise manner over a period of 20 to 30 minutes. The second portion can be made up of 20 milliliters of formalin and 7 grams of resorcinol in 30 milliliters of water. One to two grams of urea can be included as an anti-aggregation agent. The solutions should never be prepared more than two hours before use.

It will be noted that the capsules prepared in these examples have a beige color which may be undesirable in some uses. For reasons not entirely understood, the beige coloration can be considerably alleviated by addition to the system of some small amount of urea, such as up to about 40 percent, by weight, of the resorcinol, just before or with addition of the resorcinol.

Example 3. Into a Waring Blendor cup having a capacity of about one liter, are placed 160 milliliters of a 5 percent, by weight, aqueous solution of the poly(vinyl alcohol) identified in Example 1, above, 100 milliliters of water and 150 milliliters of a capsule internal phase of a solution of 20 percent, by weight, of an acid-reactant phenol-aldehyde polymeric resin material (such as the material identified by the trademark "Durez" and sold by the Hooker Chemical Co.) is pseudocumene. The Blendor is turned on and the internal phase is emulsified to a droplet size-range of about 1–10 microns. The emulsified contents of the Blendor cup is transferred to another vessel of one-liter capacity, equipped for heating and agitation. The temperature is adjusted to about 40 to 45° C. and a solution of 5 grams resorcinol and 2 grams urea in 70 milliliters of water is added followed by the addition of 10 milliliters of 10 percent, by volume, sulfuric acid and 10 milliliters of formalin. One-half to one hour later a solution of 7 grams resorcinol, 1 gram urea, 40 milliliters water and 20 milliliters formalin is added in dropwise fashion over a over-half to one hour period. When this addition is completed, the system temperature is raised to about 55 degrees centigrade and the system is agitated for about 1½ to 3 hours more to complete the condensation and chemically harden the capsule walls. The pH is adjusted to about 4.5 using an aqueous sodium hydroxide solution.

The slurry of capsules can be combined with additional binder material and filler material and coated onto paper and dried to make a coating of capsules for use in a pressure-responsive paper system containing a leuco dye.

Capsules of this invention can also be made to contain a solution of a chelating compound such as 2-ethyl-hexyl-gallate for subsequent reaction with a metal such as vanadium or iron, to form a colored reaction product.

Example 4. In this example, capsules are prepared in substantial conformance with the techniques described in Examples 1 and 2, above, except that the poly(vinyl alcohol) material used therein is replaced by the following: 120 milliliters of 5 percent, by weight, aqueous solution of highly hydrolyzed poly(vinyl alcohol), for example, the material as defined in Example 1; and 40 milliliters of 5 percent, by weight, aqueous solution of partially hydrolyzed poly(vinyl alcohol), for example, about 87 to 89 percent hydrolyzed and having a molecular weight of about 125,000 and a viscosity of about 35 to about 45 centipoises in a 4 percent, by weight, aqueous solution at 20° C (such as the material designated by the trademark, "Elvanol 50–42" sold by E. I. duPont de Nemours and Co., Wilmington, Delaware, United States of America).

Although a portion of partially-hydrolyzed poly(vinyl alcohol) material is used in this example, care is exercised to keep the concentration thereof well below that at which phase separation in an amount adequate to produce isolable capsules will occur spontaneously without polymerization of the components. The use of a relatively large proportion of partially-hydrolyzed poly(vinyl alcohol) will result in substantial spontaneous phase separation and should be avoided. The average diameter of capsules made in this Example is 15 to 100 microns.

Example 5. In this example, capsules are made according to the technique and procedure of Examples 1 or 2, above, with the exceptions that a different type of highly hydrolyzed poly(vinyl alcohol) is substituted gram-for-gram for the poly(vinyl alcohol) of Example 1 and cumene (isopropylbenzene) is substituted for xylene as the capsule internal phase. The poly(vinyl alcohol) used herein is about 99.0 to about 99.8 percent hydrolyzed, and exhibits a viscosity of about 4 to about 6 centipoises in a 4 percent, aqueous solution at 20 degress centigrade (such as the material designated by the trademark "Elvanol 70–05" sold by E. I. duPont de Nemours and Co., Wilmington, Delaware, United States of America). The capsule product is substantially identical with the product of the previous examples except, of course, that the capsules contain cumene.

Example 6. In this example, capsules are made according to the technique and procedure of Examples 1 or 2, above, with the exceptions that a different type of highly hydrolyzed poly(vinyl alcohol) is substituted gram-for-gram for the poly(vinyl alcohol) of Example 1 and 100 milliliters of toluene is substituted for the xylene as the capsule internal phase. In this example, highly-hydrolyzed poly(vinyl alcohol), resorcinol, and formaldehyde are brought together in an aqueous capsule manufacturing vehicle to yield microcapsules 10 to 40 microns in diameter and containing toluene. The poly(vinyl alcohol) used is about 97.6 to 98.4 percent hydrolyzed, and is characterized by exhibiting a viscosity of about 45 to about 55 centipoises in a 4 percent, by weight, aqueous solution at 20° C. (such as the material designated by the trademark, "Elvanol 72–51" sold by E. I. duPont de Nemours and Co., Wilmington, Delaware, United States of America). In this example, the capsules are separated from the manufacturing vehicle by vacuum filtration and the filter cake is dried to yield about 95 grams of free-flowing, toluene-containing capsules.

Example 7. The above examples are repeated by using a poly(vinyl alcohol) about 99.0 to about 99.8 percent hydrolyzed, and exhibiting a viscosity of about 55 to about 65 centipoises in a 4 percent, aqueous solution at 20° C. (such as the material designated by the trademark "Elvanol 72–60" sold by E. I. duPont de Nemours and Co., Wilmington, Delaware, United States of America). Polyhydroxy phenolic materials other than resorcinol can also be used in the above examples. Catechol and phloroglucinol are preferred after resorcinol. Aldehyde material other than formaldehyde can also be used. For example, glutaraldehyde glyoxal and furfural are eligible for use herein.

Different amounts of the poly(vinyl alcohol) solution are tested in the examples above and, of the 5 percent solutions, from 80 to 200 milliliters is found to be preferred, depending upon the type of poly(vinyl alcohol) used. Specifically, larger amounts of the lower viscosity poly(vinyl alcohol)s are required to produce capsules which are equivalent, especially in size, although not necessarily in quality to those capsules manufactured in the presence of the higher viscosity poly(vinyl alcohol)s.

Example 8. Capsules are made in this example in accordance with the technique and procedure of Example 2 with the exception that the durations permitted for the capsule wall-forming reactions are shortened such that the entire encapsulation procedure is completed in about two hours. Also, 4 additional grams of urea are used in the original solution to further alleviate the tendency toward capsule aggregation. The formalin is added over a period of about 40 minutes and the agitation at elevated temperature is completed after only slightly more than one hour.

Example 9. The technique and procedure of Example 1 is again repeated in this example with the exception that the pH of the system is maintained at about 3.6 to 4.0 instead of 1.6 to 1.8. Also, in this example the temperature is maintained at about 55° to 60° C. and the entire addition of formalin is made initially. The agitation period is extended to about 16 hours to assure completion of the reaction. The reaction of this example can be conducted at pH up to about 7 with concomitant increase in reaction time and temperature to assure reaction completion.

Example 10. Any of the previous examples can be repeated using a solid capsule core material such as a finely-divided solid material of about 1 to 100 microns in average particle size. The solid material can be, for example, biphenyl or naphthalene.

What is claimed is:

1. A process for manufacturing minute capsules, en masse, comprising the steps of:
   a. establishing an agitating single-phase aqueous solution system of a complex combination of substantially hydrolyzed poly(vinyl alcohol) and a water-soluble polyhydroxy phenolic material having at least two phenolic hydroxy groups
   b. dispersing into the solution system particles of an intended capsule core material substantially insoluble in the system
   c. adding to the system and maintaining a solution, aldehydic material selected from the group consisting of formaldehyde, furfural, glutaraldehyde and glyoxal, soluble in the system and substantially unreactive with the intended capsule core material
   d. continuing agitation of the system to yield a polymerization reaction between the polyhydroxy phenolic material and the aldehydic material resulting in:
      i. liquid-liquid phase separation of the polymerization product above a molecular weight to be soluble in the system and
      ii. continued reaction of the separation liquid polymerization product to solid capsule wall material individually surrounding particles of the dispersed intended capsule core.

2. The process of claim 1 wherein the poly(vinyl alcohol) is more than 96 percent hydrolyzed.

3. The process of claim 1 wherein the polyhydroxy phenolic material is selected from the group consisting of catechol, gallic acid, 4-hexylresorcinol, pyrogallol, resorcinol, and tannic acid.

4. The process of claim 1 wherein the polyhydroxy phenolic material is selected from the group consisting of resorcinol and catechol.

5. A process for manufacturing minute capsules, en masse, comprising the steps of:
   a. establishing an agitating single-phase aqueous solution system of aldehydic material selected from the group consisting of formaldehyde, furfural, glutaraldehyde and glyoxal and a complex combination of poly(vinyl alcohol) and water-soluble polyhydroxy phenolic material having at least two phenolic hydroxy groups;
   b. dispersing into the system particles of an intended capsule core material substantially in-soluble in the system;
   c. continuing agitation of the system to accomplish
      i. polymerization reaction between the aldehydic material and the polyhydroxy phenolic material ii. liquid-liquid phase separation of the polymerization reaction product to wet and enwrap the dispersed particles of intended capsule core material as capsule wall material and iii. further polymerization reaction to solidify the capsule wall material and render it completely insoluble.

6. The process of claim 5 wherein the poly(vinyl alcohol) is more than 96 percent hydrolyzed.

7. The process of claim 5 wherein the polyhydroxy phenolic material is selected from the group consisting of catechol, gallic acid, 4-hexylresorcinol, pyrogallol, resorcinol, and tannic acid.

8. The process of claim 5 wherein the polyhydroxy phenolic material is selected from the group consisting of resorcinol and catechol.

9. A process for manufacturing minute capsules, en masse, comprising the steps of:

a. establishing an agitating single-phase, aqueous, solution system of substantially hydrolyzed poly(vinyl alcohol)

b. dissolving in the aqueous system i. polyhydroxy phenolic material having at least two phenolic hydroxy groups ii. aldehydic material selected from the group consisting of formaldehyde, furfural, glutaraldehyde, and glyoxal, the polyhydroxy phenolic material yielding a dissolved complex with the poly(vinyl alcohol) and the aldehydic material reacting with the polyhydroxy phenolic material to yield a liquid-liquid-phase-separated polymerization product c. dispersing in the system particles of an intended capsule core material substantially insoluble in the system and substantially unreactive with the components of the system, the dispersed particles being wet and enwrapped by the liquid, phase separated, polymerization product d. continuing agitation of the system to further polymerize the polyhydroxy phenolic material into solid capsule wall material insoluble in the system.

10. The process of claim 9 wherein the poly(vinyl alcohol) is more than 96 percent hydrolyzed.

11. The process of claim 9 wherein the polyhydroxy phenolic material is selected from the group consisting of catechol, gallic acid, 4-hexylresorcinol, pyrogallol, resorcinol, and tannic acid.

12. The process of claim 9 wherein the polyhydroxy phenolic material is selected from the group consisting of resorcinol and catechol.

* * * * *